United States Patent [19]

Marlett

[11] Patent Number: 4,474,743
[45] Date of Patent: Oct. 2, 1984

[54] PREPARATION OF SILANE FROM AMINE ALANES

[75] Inventor: Everett M. Marlett, Baton Rouge, La.

[73] Assignee: Ethyl Corporation, Richmond, Va.

[21] Appl. No.: 516,130

[22] Filed: Jul. 21, 1983

[51] Int. Cl.$^3$ ............................................. C01B 33/04
[52] U.S. Cl. .................................... 423/347; 423/489
[58] Field of Search .............................. 423/347, 489; 252/188.27

[56] References Cited

U.S. PATENT DOCUMENTS

| | | | |
|---|---|---|---|
| 2,680,059 | 6/1954 | Bragdon | 23/14 |
| 3,159,626 | 12/1964 | Ashby | 260/242 |
| 3,642,853 | 2/1972 | Murib et al. | 260/448 R |
| 3,926,833 | 12/1975 | Hoffman et al. | 252/188.27 |
| 4,006,095 | 2/1977 | Hoffman et al. | 252/188.27 |
| 4,374,111 | 2/1983 | Lefrancois | 423/347 |

FOREIGN PATENT DOCUMENTS

| | | | |
|---|---|---|---|
| 235165 | 1/1960 | Australia | 423/347 |
| 651762 | 11/1962 | Canada | 423/347 |

OTHER PUBLICATIONS

J.A.C.S., vol. 82, pp. 2141–2144, May 5, 1960–"The Amine Complexes of Aluminum Hydride, I.", by Ruff et al.

Primary Examiner—John Doll
Assistant Examiner—Steven Capella
Attorney, Agent, or Firm—Donald L. Johnson; John F. Sieberth; John F. Hunt

[57] ABSTRACT

A process for the coproduction of silane and AlF$_3$ is described. SiF$_4$ and amine alane (AlH$_3$.NR$_3$) complexes are reacted to produce gaseous silane and AlF$_3$ coproduct. The amine tends to complex somewhat with coproduct AlF$_3$ but is released therefrom by heating. AlF$_3$ is a very saleable commodity thereby making the invention an improvement over other hydride reactions which produce less usable coproducts.

30 Claims, No Drawings

PREPARATION OF SILANE FROM AMINE ALANES

FIELD OF THE INVENTION

This invention relates to the production of silane.

BACKGROUND

Silane can be produced from chlorosilanes including silicon tetrachloride. For example, the reaction of LiAlH$_4$ with SiCl$_4$ in an ether reaction medium is known to produce silane.

Alane, that is aluminum trihydride or AlH$_3$, has in the past been produced from the reaction of LiAlH$_4$ and AlCl$_3$ in ethers. Also known is the production of an alane dimethyl ether solution from the reaction of LiH and AlCl$_3$ in dimethyl ether, catalyzed by NaAlH$_4$.

Amines are used to produce amine alanes for subsequent syntheses. For example, LiAlH$_4$ can be reacted with a trialkyl amine·HCl complex to precipitate LiCl and form AlH$_3$·NR$_3$ where R is alkyl.

The reaction of LiAlH$_4$ with silicon tetrafluoride has been reported. Although the by-products of this reaction have not been described, it is believed that they would comprise complex lithium aluminum fluorides such as Li$_3$AlF$_6$, Li$_5$Al$_3$F$_{14}$, etc., along with some AlF$_3$. Compared to AlF$_3$, these lithium aluminum fluorides are low value materials of minimal utility.

My prior copending application Ser. No. 449,486 filed Dec. 13, 1982 describes an excellent process for the preparation of silane. In that process the by-products comprise a mixture of AlF$_3$ and complex sodium aluminum fluorides.

SUMMARY OF THE INVENTION

This invention provides a process which coproduces only AlF$_3$, a more useful and saleable coproduct than the complex alkali metal aluminum fluorides.

More particularly this invention produces silane and aluminum trifluoride from the reaction of an amine alane and silicon tetrafluoride, SiF$_4$. The aluminum trifluoride is especially valuable if it can be made substantially amine-free from the complex which ordinarily forms. AlF$_3$ is used in the aluminum industry as an electrolyte component for production and refining.

In the process of this invention silane and aluminum trifluoride are coproduced by reacting a tertiary amine-aluminum trihydride complex with silicon tetrafluoride.

The present invention also involves a process for the coproduction of silane and substantially amine-free aluminum trifluoride, said process comprising the steps of:
(1) reacting in an inert reaction medium (i) aluminum trihydride complexed with a tertiary amine and (ii) silicon tetrafluoride so that gaseous silane and aluminum trifluoride coproduct are produced;
(2) recovering the gaseous silane; and
(3) freeing and removing tertiary amine from the aluminum fluoride coproduct, which preferably involves heating the aluminum trifluoride coproduct at an elevated temperature (typically in the range of from about 250° to about 350° C.) sufficient to release the amine from the complex and using an inert gas sweep or a vacuum for removing the freed amine.

Recovery of enriched or purified aluminum trifluoride coproduct and, if desired, the freed amine is thus readily achieved.

These and other embodiments of this invention will become still further apparent from the ensuing description and appended claims.

DESCRIPTION OF THE PREFERRED EMODIMENTS

The amine alane reactants used in the process may be prepared by any of several general methods; for example:

$$3\,NaH + AlCl_3 + R_3N \xrightarrow[\text{solvent}]{R_3Al} AlH_3{\cdot}NR_3 + 3\,NaCl\downarrow \qquad (a)$$

or

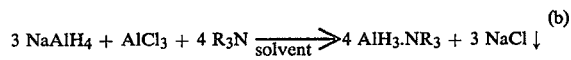

$$3\,NaAlH_4 + AlCl_3 + 4\,R_3N \xrightarrow[\text{solvent}]{} 4\,AlH_3{\cdot}NR_3 + 3\,NaCl\downarrow \qquad (b)$$

or

$$NaAlH_4 + R_3N{\cdot}HCl \xrightarrow[\text{solvent}]{} AlH_3{\cdot}NR_3 + NaCl\downarrow + H_2\uparrow \qquad (c)$$

or

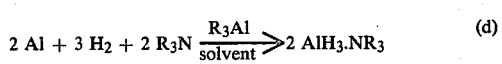

$$2\,Al + 3\,H_2 + 2\,R_3N \xrightarrow[\text{solvent}]{R_3Al} 2\,AlH_3{\cdot}NR_3 \qquad (d)$$

The amines usable with the invention include the trialkylamines especially triloweralkylamines such as trimethylamine and triethylamine. Trimethylamine is a gas at room temperature and is therefore more difficult to use in some of the above preparations of amine alane. Also, trimethylamine forms a stronger complex with AlF$_3$ coproduct such that it is more difficult to free the AlF$_3$ without long, high temperature heating and without some undesirable cleavage reactions occurring.

Triethylamine is the most preferred amine of the invention. It forms a weak complex with the AlF$_3$ coproduct such that less amine is complexed therewith and moderate heating affords vaporization of the amine.

Also usable are the tertiary polyamines such as N,N,N',N'-tetramethylethylenediamine and 1,4-diazabicyclo[2.2.2]octane. Other tertiary mono- and polyamines should also be suitable, such as tri-n-propylamine, triisopropylamine, ethyldimethylamine, diethylmethylamine, tributylamine, dimethylpropylamine, N,N,N',N'-tetramethyldiaminomethane, quinuclidine, methyl1,4-diazabicyclo [2.2.2]octane, etc.

Various reaction media may be used for the invention as long as they do not adversely affect the silane preparation. Use of a liquid reaction medium is normally preferred as the liquid medium enables better mixing of reactants, even where the reactants are not soluble in the medium.

Both ethers and hydrocarbons are suitable inert reaction media. Aromatic hydrocarbons are a preferred class of media, toluene being a highly preferred medium. The amine alane, such as AlH$_3$·NMe$_3$ can be prepared in toluene from NaAlH$_4$ and Me$_3$N·HCl (both insoluble in toluene) by mixing well therein to evolve hydrogen gas and precipitate salt. Thereafter, the amine alane can be reacted in situ with SiF$_4$ to produce a mixture of AlF$_3$, AlF$_3$·NMe$_3$, and silane.

Another suitable group of inert reaction media are the amines, preferably liquid tertiary amines. A more preferred tertiary amine is tetramethylethylenediamine. Often the same amine used as a complexer for the AlH$_3$ is suitable as the solvent/reaction medium. For best results, the tertiary amine should have a boiling point enabling it to be distilled away from the aluminum trifluoride coproduct under the temperature-pressure conditions used in freeing the amine from the aluminum trifluoride-tertiary amine complex present in the aluminum trifluoride coproduct.

In this connection, tertiary amines do tend to complex to some extent with the aluminum trifluoride coproduct formed in the process. Nevertheless as pointed out above, tertiary amines can be successfully employed as "inert" reaction media or reaction diluents, the term "inert" being employed herein to signify that the reaction medium does not interfere with the desired reaction (i.e. the production of silane and aluminum fluoride coproduct) even though the medium or diluent may tend to undergo complexation with the aluminum fluoride coproduct. Naturally the medium selected should not form complexes with the aluminum fluoride which cannot be readily decomposed to form aluminum trifluoride and the free medium.

The product yields and degree of difficulty to free the amine from the $AlF_3$ may vary somewhat from amine to amine but in general the tertiary amines are usable in the process both as $AlH_3$ complexers and, if liquid under the reaction conditions used, as liquid reaction media as well. When tertiary amine is employed as the sole liquid inert reaction medium it will of course be present in quantity in excess of that required to complex with the aluminum hydride system present in the system. Mixtures of tertiary amines with hydrocarbons (e.g., toluene, xylene, mesitylene, ethylbenzene, etc.) or with ethers (e.g., dimethyl ether, diethyl ether, dioxane, tetrahydrofuran, etc.) are also suitable inert media.

The silane forming reaction of the invention may be carried out over a broad range of temperature. In one case, $SiF_4$ gas may be condensed onto the other reactants frozen at low temperature in a liquid nitrogen bath. Thereafter the reaction proceeds as the reactants are allowed to warm. A suitable range of temperature for the reaction is about 0° to about 100° C. A preferred range is about 5° to about 80° C.

The silane forming reaction may be carried out over a broad range of pressures including atmospheric. Good results are achieved where gaseous $SiF_4$ is sparged through a liquid reaction medium containing an amine alane, the inert solvent serving to keep the mixture fluid enough for good agitation.

Use in the silane forming reaction of $AlH_3$ in an ether medium without a complexed amine requires high dilution to maintain acceptable agitation. Also the ethers tend to cleave during such reaction, and recovery of $AlF_3$ from the resulting complex mixture is difficult. When an amine is complexed with the alane, the solubility is usually increased, especially in aromatic hydrocarbon solvents.

When $NaAlH_4$ is used to prepare the complexed amine alane, a relatively pure source is desirable especially where trace metals are present. The $NaAlH_4$ is preferably recrystallized if the $NaAlH_4$ is prepared from aluminum containing e.g., 1900 ppm titanium. Otherwise, autodecomposition of the alane may occur if the crude mixture is heated or allowed to stand for long periods. Crude $NaAlH_4$ can be used successfully if the product solution of $AlH_3 \cdot NR_3$ is filtered from the byproduct salts and other impurities.

The reaction mixtures of the invention are often gel-like in appearance, but agitation and filtration of the slurries are relatively easy.

The $AlF_3$ coproduct is readily separated from the complexed amine by heating. Preferably an inert gas such as helium, hydrogen, argon, nitrogen, etc. is swept over the solid coproduct while heating to direct the amine to a suitable condensation system, such as a condenser or trap where it may be recovered and, if desired, recycled. When the complexed amine is triethylamine, heating vaporizes the amine very well. At 95° C. the triethylamine complex is not significantly affected; at 200° C., a small fraction of the amine is freed after a short time; at 250° C., more than one-half the amine is eliminated and at 300° C. or higher substantially all the amine is separated from the $AlF_3$ coproduct.

Alternatively, the aluminum trifluoride coproduct may be heated under reduced pressure whereby the liberated tertiary amine can be readily separated from the residual aluminum trifluoride product.

If a sweep gas or vacuum (reduced pressure) is not used, amine degradation may occur during heating of the $AlF_3$ coproduct.

Other methods may be used to separate the amine from the aluminum fluoride coproduct. For example, use of aqueous HF followed by ethanol extraction reduced the content of complexed $Et_3N$ in the $AlF_3$ product from 20 to 12 percent. Concentrated HCl followed by $CHCl_3$ extraction also lowered the amine content. At $HCl/Et_3N$ ratios of 1, 2, and 3 the amine retained was lowered from 20 to 17, 7, and 4 percent, respectively. Ethanol containing one equivalent of HBr reduced $Et_3N$ from 20 to 4 percent, but some of the coproduct $AlF_3$ also reacted with the alcohol.

The following examples, in which all percentages are by weight, are illustrative and serve to demonstrate the best mode now known to me for carrying out my invention. In these examples the reactions to form the amine alanes were conducted under dry nitrogen and the silane forming reactions were conducted in an atmosphere of prepurified hydrogen.

EXAMPLE 1

A 65 cc spherical stainless steel reactor was charged with 0.60 gram (0.0067 mole) aluminum trihydride trimethylamine complex ($AlH_3 \cdot NMe_3$) and 12.0 grams dry toluene solvent. The reactor was fitted with a needle valve and connected to a gas collection train. The gas train was evacuated and liquid nitrogen was placed around the reactor. The needle valve was then opened to evacuate the reactor and its frozen contents. The needle valve was closed and $SiF_4$ gas was bled into a calibrated section of the gas train. The needle valve was reopened and 0.0049 mole of $SiF_4$ condensed into the $AlH_3 \cdot MNe_3$ and toluene. The needle valve was again closed and the excess $SiF_4$ gas was pumped out of the transfer lines. The quantity of $SiF_4$ in the reactor was determined from the pressure change and temperature in the calibrated section. The reactor was warmed to 40° C. and a magnetic stirrer was started. The reactor was disconnected and shaken well midway through the one-hour reaction period. After one hour the reactor was cooled with a dry ice/acetone slush before venting to the evacuated calibrated section. A liquid nitrogen trap was used to accumulate condensibles. The reactor was warmed to about 0° to 4° C. and the gas present was transferred to the calibrated section for measurement. Analysis of the product gas showed a 73% silane yield on $AlH_3 \cdot NMe_3$ (74.5% on $SiF_4$) About 12.53 grams toluene slurry was recovered from the reactor. The residue slurry was filtered giving 6.94 grams filtrate. The filter cake was stripped of solvent in vacuo (1–2 torr) at 95° C. About 0.66 gram dry solids were obtained. They were analyzed by NMR and found to contain 20.5% Me₃N complexed to AlF₃. About 0.50 gram of the solids was heated in a muffle furnace at 250° C. After one hour the weight was 0.45 gram; after two hours the weight was 0.44 gram. After 24 hours in the furnace, the amine content had been reduced to 6.6%.

EXAMPLE 2

A complex of aluminum trihydride and triethylamine was prepared according to the following reaction:

$$3NaAlH_4 + AlCl_3 + 4Et_3N \rightarrow 4AlH_3 \cdot NEt_3 + 3NaCl$$

In this operation about 0.45 gram (0.0033 mole) AlCl₃ was added to 12.0 grams dry toluene and then 1.35 grams (0.0133 mole) Et₃N was slowly added. The solid AlCl₃ almost completely disappeared but after about five minutes a flocculate appeared. About 0.61 gram (0.01 mole) NaAlH₄ (88.5% purity) was added to the mixture which was then heated a little and stirred overnight. The product slurry was filtered and the cake rinsed with 2 grams dry toluene. The combined filtrate was clear.

Next, silane was prepared by the following reaction:

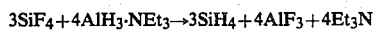

$$3SiF_4 + 4AlH_3 \cdot NEt_3 \rightarrow 3SiH_4 + 4AlF_3 + 4Et_3N$$

In this operation a 50 ml three-neck, round bottom flask reactor attached to the gas collection train referred to in Example 1 was employed. Gaseous SiF₄ (0.0091 mole) was bubbled into the AlH₃·NEt₃ toluene solution in the reactor. Gel-like solids appeared and the reaction mixture foamed a little. The yield of silane was 55% based on SiF₄. The low yield was attributed to incomplete formation of the AlH₃·NEt₃ complex.

EXAMPLE 3

About 1.80 grams (0.0135 mole) AlCl₃ was mixed with 45 grams dry toluene and then 5.40 grams (0.0534 mole) triethylamine was added. The solids disappeared to form an almost clear solution of AlCl₃·NEt₃ to which was slowly added 2.56 grams (0.042 mole) NaAlH₄ (88.5% purity). The mixture became warm. It was stirred for two hours and allowed to stand overnight before filtering. The clear filtrate weighed 46.4 grams and analyzed 10.65% AlH₃·NEt₃. The filter cake was washed with toluene and dried in vacuo at 95° C. to recover 2.61 grams of solids, predominantly NaCl.

To a 50 ml three-neck, round bottom flask was added about 16.4 grams (0.0133 mole) of the 10.65% AlH₃·NEt₃ solution and the flask was attached to the gas collection train. Then 0.010 mole SiF₄ was fed through a ⅛ inch polytetrafluoroethylene line into the flask for reaction with the AlH₃·NEt₃ at about 46° C. The silane yield by gas chromatography/mass spectrometry was 91.5% based on SiF₄. The product solids were analyzed and found to contain 19.5% Et₃N.

EXAMPLE 4

The procedure of Example 3 was followed with 18.0 grams (0.0146 mole) of a 10.65% solution of AlH₃·NEt₃ in toluene and about 0.010 mole SiF₄ bubbled in for reaction at about 42 to 48° C. The silane yield was 97% on SiF₄. The filtered coproduct was rinsed with toluene and dried in vacuo at 95° C. to provide 1.22 grams of solid which was indicated by NMR analysis to contain 18.3% Et₃N.

EXAMPLE 5

A batch of AlH₃·NEt₃ was prepared as in Example 2 from 2.25 grams (0.0167 mole) AlCl₃ in 45 grams dry toluene and 6.73 grams (0.0667 mole) Et₃N. Almost all the solids dissolved and the mixture was stirred one hour in a 75° C. oil bath. The mixture gassed extensively. A second 2.25 gram portion of AlCl₃ in 45 grams toluene was added to a second 6.73-gram portion of Et₃N to provide an almost clear solution. To this was added 3.07 grams NaAlH₄ which was 88.5% pure (0.0501 mole). The temperature of the mixture rose to about 45° C. at which point an ice water bath was applied to prevent further heating. After thirty minutes the bath was removed and the mixture was stirred at room temperature for about 3.5 more hours. After filtering through glass fiber filter paper three times the solution was very clear and weighed 46.0 grams. Analysis showed a 14.4% AlH₃·NEt₃ solution. About 12.12 grams of this solution (0.0133 mole AlH₃) was charged to the reactor attached to the gas collection train and SiF₄ gas was fed thereto. The silane yield was 97%.

EXAMPLE 5A

A 49.8 gram (0.066 mole) solution of AlH₃·NEt₃ in toluene prepared as in Example 5 was charged to a 100 ml, three-neck round bottom flask which was connected to the gas collection train. About 0.05 mole SiF₄ was fed into the reactor for reaction at about 38° to 52° C. over a period of one hour and fifteen minutes. In this example the silane product was vented off and the reaction slurry processed for recovery of coproduct AlF₃. The slurry was filtered through a 3 cm diameter glass fiber filter paper. The filtrate weighed 43.12 grams and the wet cake 8.09 grams. The cake was solvent stripped under vacuum at 95° C. for four hours. The dry cake weighed 6.22 grams and was soluble in water. NMR analysis of a portion of the cake showed 19.8% residual Et₃N. Based on the weight and analysis of the recovered solids, the yield of AlH₃·NEt₃ was at least 93%.

EXAMPLE 6

A portion of dry AlF₃ complexed with Et₃N (21.7%) was prepared in the same manner as in Example 5A. A glass unit was constructed such that it could be charged with the AlF₃·NEt₃, submerged in a heating bath, and the volatiles swept out for recovery in a liquid N₂ cooled trap. A silicone 1000 cs oil was used for the heating bath. The glass unit was a three-inch long 18 mm diameter tube. The unit was charged with 1.78 grams of the AlF₃ (containing 0.39 grams of Et₃N) and connected to a helium cylinder at one end and to a small coil-type trap at the other, thence to an oil bubbler. A very slow stream of helium gas was passed through the unit which was immersed in the 350° C. oil bath. The trap was submerged in liquid N₂ in a Dewar flask. The solids in the unit were held at 320° to 350° C. for thirty minutes, then raised out of the oil bath and cooled. The volatiles in the trap were momentarily warmed and swept into a sample bulb for analysis; no CH₄, C₂H₄ or C₂H₆ was detected. The solid sample in the tube now weighed 1.45 grams for a net loss of 0.33 gram. Droplets of clear liquid in the exit of the unit were rinsed out with CH₂Cl₂ for analysis. The total weight loss was now 0.40 gram. NMR analysis of the hydrolyzed solid from the unit showed only 1.3% Et₃N or 94% removal of Et₃N. The droplets were shown to contain Et₃N and a trace of a higher boiling organic fluorosilane.

Analysis of the condensibles from the trap showed primarily Et$_3$N (99.4%) along with H$_2$O, toluene and C$_2$H$_5$Cl. The AlF$_3$ had a sharp X-ray diffraction pattern which did not match that of known AlF$_3$ phases.

EXAMPLE 6A

The procedure of Example 6 was repeated using purified H$_2$ as the sweep gas. A dry ice/acetone bath was used for the trap. The starting solids contained 21.7% Et$_3$N; the final solid AlF$_3$ product contained only 0.45% Et$_3$N by NMR analysis. The weight loss was 0.46 gram (i.e., 2.02 g minus 1.56 g) which represents 22.8%. The volatiles collected and analyzed contained 99.8 area percent Et$_3$N and 0.16% toluene.

EXAMPLE 7

This example demonstrates the use of an amine reaction medium. About 0.90 gram (0.0067 mole) AlCl$_3$ was added to 18.0 grams freshly distilled (in LiAlH$_4$) tetramethylethylenediamine (TMEDA) whereupon the mixture heated up (exothermic reaction) and an insoluble yellow-white complex formed. After an hour 1.13 grams (0.020 mole, 96% recrystallized) NaAlH$_4$ was added. The mixture was stirred overnight at room temperature under a nitrogen atmosphere. A fine white precipitate was filtered off leaving 15.45 grams filtrate. The filtrate was analyzed and the yield of the complex that was soluble in the TMEDA was found to be about 66%. The solution became somewhat cloudy and was used in the gas collection train apparatus described in the previous examples. About 11.66 grams of the AlH$_3$·TMEDA solution was reacted with SiF$_4$ fed from the reservoir as described above.

The silane yield on SiF$_4$ was 81% or 54% overall. The same recovery procedure using a hydrogen sweep and heating at 350° C. gave a brown sublimate and condensate (as opposed to white or colorless condensates with Me$_3$N or Et$_3$N compositions). The residual solids were tan in color. Analysis of the residual solids indicated that separation and recovery of the TMEDA from AlF$_3$ was not quite as good as for Me$_3$N or Et$_3$N.

All of the NaAlH$_4$ used in the above examples was prepared from aluminum containing 1900 ppm titanium. It appears that the titanium catalyzes the decomposition of the AlH$_3$ formed therefrom.

While preferred embodiments of the invention have been described above in detail, various aspects of the invention may be altered without departing from the scope of spirit of the invention as defined by the appended claims.

I claim:

1. A process for the coproduction of silane and aluminum trifluoride, said process comprising reacting a tertiary amine-aluminum trihydride complex with silicon tetrafluoride.

2. The process of claim 1 wherein said amine is a triloweralkylamine.

3. The process of claim 2 wherein said triloweralkylmine is trimethylamine.

4. The process of claim 2 wherein said triloweralkylamine is triethylamine.

5. The process of claim 1 wherein said amine is 1,4-diazabicyclo[2.2.2]octane.

6. The process of claim 1 wherein said amine is N,N,N',N'-tetramethylethylenediamine.

7. The process of claim 1 wherein the reaction is carried out in a liquid inert reaction medium.

8. The process of claim 7 wherein said reaction medium is predominantly a hydrocarbon.

9. The process of claim 7 wherein said reaction medium is predominantly an aromatic hydrocarbon.

10. The process of claim 7 wherein said reaction medium is predominantly toluene.

11. The process of claim 7 wherein said reaction medium is predominantly an ether.

12. The process of claim 7 wherein said reaction medium is predominantly a tertiary amine.

13. The process of claim 7 wherein said reaction medium is predominantly triethylamine.

14. The process of claim 7 wherein said reaction medium is predominantly N,N,N',N'-tetramethylethylenediamine.

15. The process of claim 1 wherein the aluminum trifluoride coproduct comprises aluminum trifluoride-tertiary amine complex and at least a portion of said coproduct is heated to an elevated temperature sufficient to liberate tertiary amine from said complex.

16. The process of claim 15 further comprising separating the liberated tertiary amine from the heated coproduct.

17. The process of claim 16 further comprising recovering the separated amine.

18. The process of claim 15 wherein the elevated temperature is in the range of about 250° to about 350° C.

19. The process of claim 15 wherein the coproduct is heated under reduced pressure.

20. The process of claim 15 wherein the coproduct is heated under a sweep of inert gas.

21. The process of claim 1 carried out at a temperature in the range of about 5° to about 80° C.

22. A process for the coproduction of silane and amine-free aluminum trifluoride, said process comprising the steps of:
(1) reacting in an inert reaction medium (i) aluminum trihydride complexed with a tertiary amine and (ii) silicon tetrafluoride so that gaseous silane and aluminum trifluoride coproduct are produced;
(2) recovering the gaseous silane; and
(3) freeing and removing tertiary amine from the aluminum trifluoride coproduct.

23. The process of claim 22 wherein the tertiary amine is freed and removed from the aluminum fluoride coproduct by heating the aluminum fluoride coproduct to an elevated temperature sufficient to release the amine from the complex, said heating being conducted under a sweep of inert gas or at reduced pressure to facilitate removal of the released amine from the aluminum fluoride.

24. The process of claim 22 wherein said amine is a triloweralkylamine.

25. The process of claim 22 wherein said amine is triethylamine.

26. The process of claim 22 wherein said reaction medium is predominantly an aromatic hydrocarbon.

27. The process of claim 22 wherein said reaction medium is predominantly toluene.

28. A process for the coproduction of silane and amine-free aluminum trifluoride, said process comprising the steps of:
(1) reacting in an inert reaction medium comprising predominantly aromatic hydrocarbon (i) aluminum trihydride complexed with a tertiary amine and (ii) silicon tetrafluoride so that gaseous silane and aluminum trifluoride coproduct are produced;

(2) recovering the gaseous silane;

(3) recovering inert reaction medium and uncomplexed tertiary amine from the reaction mixture thereby leaving a mixture of solids composed predominantly of uncomplexed aluminum trifluoride and aluminum trifluoride complexed with tertiary amine;

(4) heating the mixture of solids at an elevated temperature sufficient to free tertiary amine from aluminum trifluoride-tertiary amine complex; and (5) recovering the freed tertiary amine.

29. The process of claim 28 wherein said aromatic hydrocarbon is predominantly toluene.

30. The process of claim 28 wherein said tertiary amine is vaporized at the temperature and pressure conditions employed in step (4).

* * * * *

UNITED STATES PATENT AND TRADEMARK OFFICE
CERTIFICATE OF CORRECTION

PATENT NO. : 4,474,743
DATED : OCTOBER 2, 1984
INVENTOR(S) : EVERETT M. MARLETT

It is certified that error appears in the above-identified patent and that said Letters Patent is hereby corrected as shown below:

Column 4, line 50, "$AlH_3 \cdot MNe_3$" should read -- $AlH_3 \cdot NMe_3$ --.

Column 4, line 51, "SiF4" should read -- $SiF_4$ --.

Signed and Sealed this

Sixteenth Day of April 1985

[SEAL]

Attest:

DONALD J. QUIGG

Attesting Officer     Acting Commissioner of Patents and Trademarks